H. I. DILTS.
WATER METER.
APPLICATION FILED DEC. 14, 1909.
966,388. Patented Aug. 2, 1910.
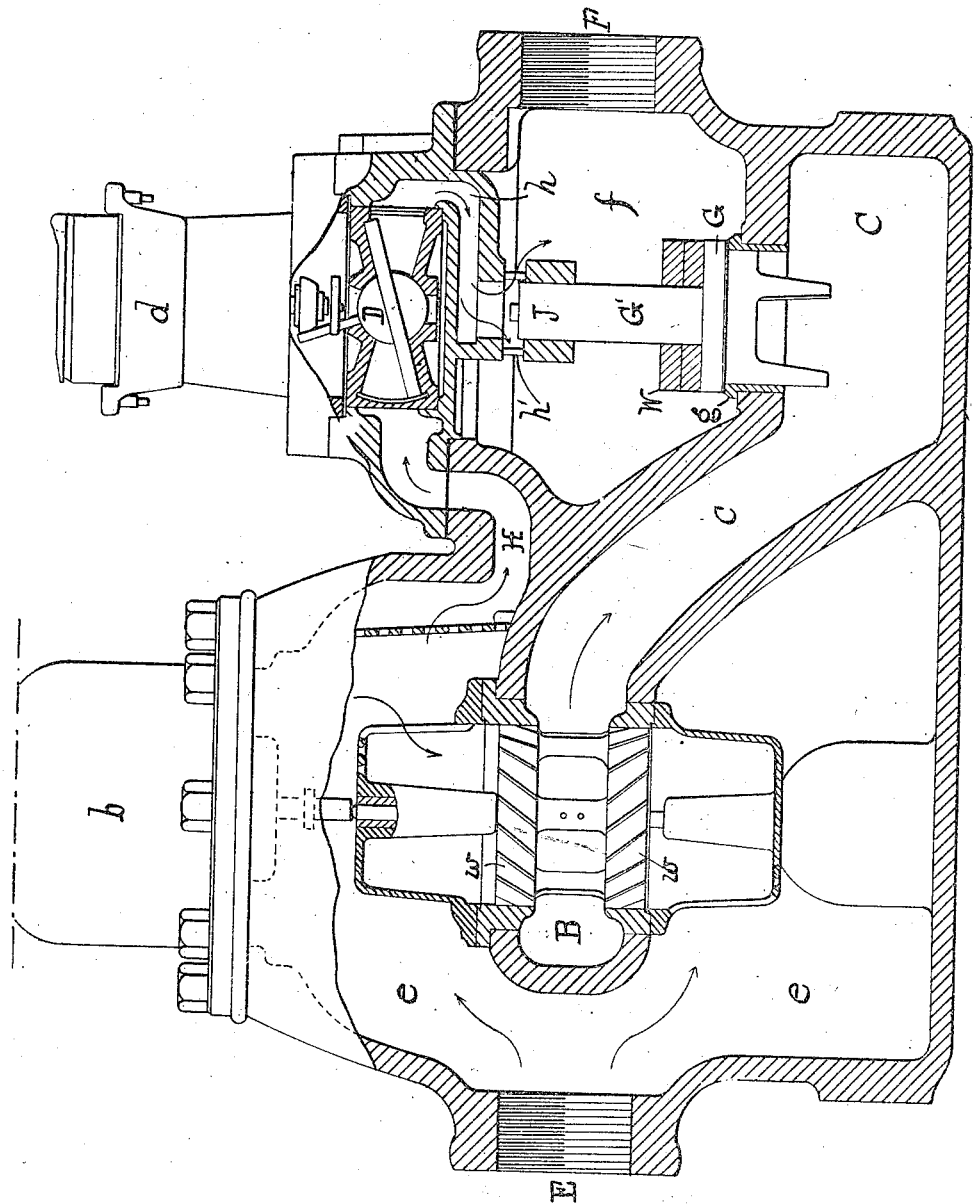
WITNESSES:
INVENTOR
Henry I. Dilts
BY
Howson and Howson
ATTORNEY

UNITED STATES PATENT OFFICE.

HENRY I. DILTS, OF LONG ISLAND CITY, NEW YORK, ASSIGNOR TO NEPTUNE METER COMPANY, OF LONG ISLAND CITY, NEW YORK, A CORPORATION OF NEW YORK.

WATER-METER.

966,388.     Specification of Letters Patent.     Patented Aug. 2, 1910.

Application filed December 14, 1909. Serial No. 533,017.

*To all whom it may concern:*

Be it known that I, HENRY I. DILTS, a citizen of the United States of America, and residing in Long Island City, in the borough of Queens and State of New York, have invented certain new and useful Improvements in Water-Meters, of which the following is a specification.

The object of my invention is to construct a simple and efficient liquid-measuring apparatus of that class in which the meter is of the compound type, provided with two metering devices, one adapted for relatively high duty and another for relatively low duty, arranged in two branches with the inflow and outflow common to both, and two valves, one controlling the flow through the high duty meter and the other through the low duty meter and operated by varying pressure differential to cause the flow to take place only through one or the other of said metering devices. This object I attain by constructing the two valves fixedly united to move together vertically as hereinafter described.

The view in the accompanying drawing is a vertical section of a compound meter constructed in accordance with my invention.

Although it is not essential, I prefer to mount the two metering devices in one and the same casing, and such a compound meter is illustrated in the drawing. The two metering devices B and D in the casing may be of any suitable or convenient construction. In the present instance I have shown the meter B as of the turbine type and adapted for relatively high duty work, that is, to register accurately large flows of liquid. The meter D is shown as of the nutating piston type and adapted for relatively low duty work, that is, to register accurately small flows of liquid. These devices B and D are provided with, or connected up to, their respective registering mechanisms indicated at $b$ and $d$.

There is a common inlet or inflow opening at E for the two meters, and a common outlet or outflow at F. The inlet E opens into a chamber $e$, from which the incoming liquid may enter the turbine meter B above and below the turbine wheels $w$, as usual, and thence pass out from the space between the wheels into a conduit C and into the chamber $f$ leading to the outlet F, provided the valve G at the end of said conduit C is open. The incoming flow of liquid has access to the low duty meter D, from chamber $e$, through a conduit H, and after passing through this meter, it can flow through the conduit $h$ into the outlet chamber $f$ and outlet F, provided the valve J is in the open position shown in the drawing.

My present invention has more especial reference to these valves G and J, in combination with the two metering devices and passages. The two valves are fixedly united, as by being made integral or otherwise, and are constructed to work vertically. The lower valve G is constructed like a check valve with an annular seat $g$ in the horizontal part of the diaphragm between the conduit C and the chamber $f$ leading to the outlet F. On the top of this valve G is mounted a straight vertical stem $G^1$, forming at its upper end a plunger or plug valve J working in a seating formed in the bored end of the outlet $h$, with its side outlets $h^1$. When the valve G is closed, these outlets $h^1$ are open as shown. The raising of the valve G will cause the plunger J to shut off these outlets.

The seating for the plunger J is fixedly united to the removable part of the casing containing the meter D, so that on removing this part from the main body of the casing, the double valve or plunger valve J G will be exposed. Weights W, W, in the form of rings may be readily slipped over the straight stem to weight the valve to just the degree required for the proper working of the valve under any given conditions.

The operation of the compound meter will be readily understood from the foregoing description. When the flow of water is small, the difference of pressure between the inlet and outlet is insufficient to raise the valve G from its seat and so long as that condition continues the liquid will flow only through the low duty meter D and will be registered thereby with accuracy. But when the pressure differential increases sufficiently to raise the valve G, the valve J will thereby be closed, and the high duty meter B will come into operation alone, and the large flow will thus be registered correctly by that meter.

By constructing the compound valve as a straight vertically moving valve, as described, its construction is very simple, it is certain in its action and not liable to get out of order, and it lends itself to a simple method of weighting, which latter will vary with varying conditions.

I claim as my invention:

1. The combination of a relatively high duty meter, a relatively low duty meter, a common conduit having branches in which the two meters are respectively located, the inflow and outflow being common to both, and two straight vertically moving valves fixedly united and controlling the branches respectively, whereby when one valve is in position closing one branch, the other valve is in open position and flow may take place through the other branch.

2. The combination of a relatively high duty meter, a relatively low duty meter, a common conduit having separate branches containing the respective meters and an inflow and an outflow common to both branches, and a vertically moving weighted valve operating to open the low duty branch and to close the high duty branch against flow under pressure lower than a predetermined minimum and to open the same under a higher pressure, and a straight vertical plug fixedly united with said valve and moved therewith under higher pressure to close the low duty branch.

In testimony whereof I have signed my name to this specification, in the presence of two subscribing witnesses.

HENRY I. DILTS.

Witnesses:
WALTER ABBE,
HUBERT HOWSON.